April 29, 1958 R. R. DENMAN 2,832,235
HYDRAULIC VALVE CONTROL FOR INTERMITTENT DRIVING MECHANISM
Filed Oct. 14, 1954 2 Sheets-Sheet 1

INVENTOR.
ROBERT R. DENMAN
BY

April 29, 1958          R. R. DENMAN          2,832,235
HYDRAULIC VALVE CONTROL FOR INTERMITTENT DRIVING MECHANISM
Filed Oct. 14, 1954                              2 Sheets-Sheet 2
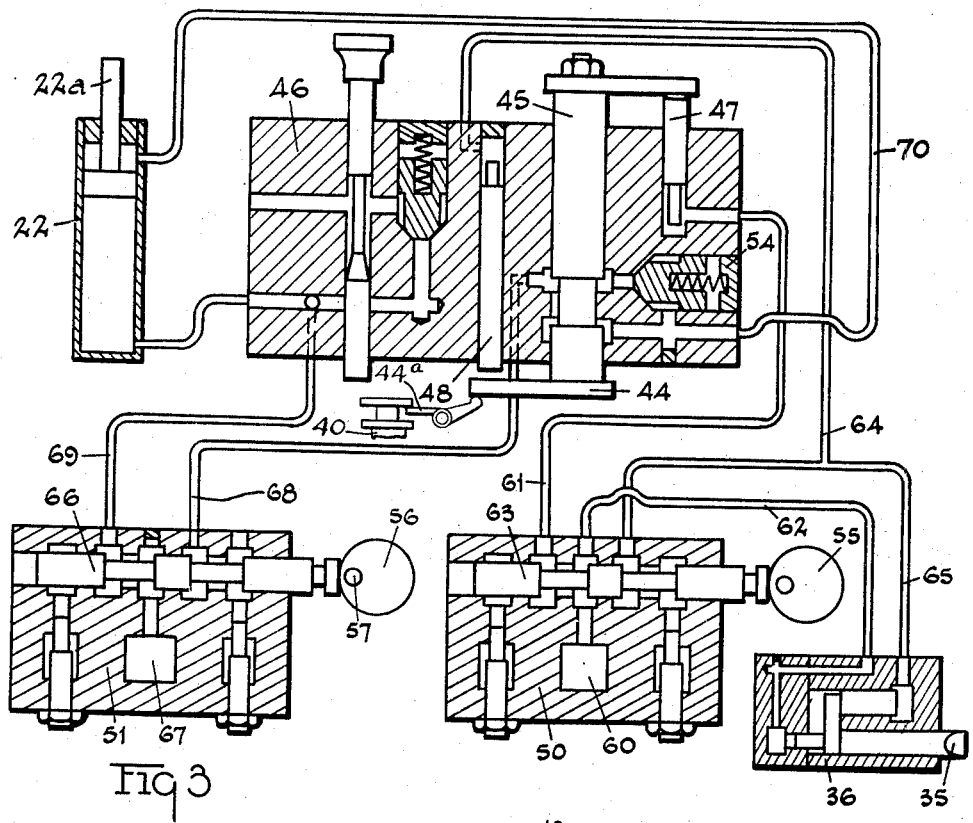
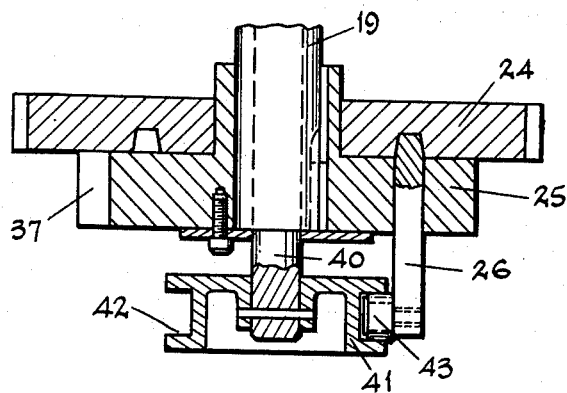
INVENTOR.
ROBERT R. DENMAN
BY
Rule and Hoge.

United States Patent Office 2,832,235
Patented Apr. 29, 1958

2,832,235

HYDRAULIC VALVE CONTROL FOR INTERMITTENT DRIVING MECHANISM

Robert R. Denman, Columbus, Ohio, assignor to Owens-Illinois Glass Company, a corporation of Ohio Application October 14, 1954, Serial No. 462,230

4 Claims. (Cl. 74—822)

My invention relates to mechanical power transmission mechanism and is of use in connection with intermittently operated driving mechanism. The invention provides novel means for intermittently locking a driven element in a fixed position. In its preferred form the invention provides means for rotating a turret, table or other unit step by step about an axis, said element being driven by a reciprocating motor or driver. A locking detent is periodically operated to lock the rotating element and prevent backward movement during the return stroke of the driver, said detent being operated by a hydraulic motor actuated in synchronism with the step rotation of the said unit.

The invention as herein illustrated is applied to apparatus for press molding glass articles. Such apparatus includes a mold table or turret mounted for rotation about a vertical axis for transferring parisons from a blank mold to a finishing mold. The mold table is rotated step-by-step by a piston motor operating through a rack and gear. An indexing pin operatively connects the gear to the mold table during the forward stroke of the motor piston. A locking detent holds the rotary mold table stationary during the return stroke of the motor piston. Hydraulic motors operate the said indexing pin and locking detent.

Referring to the accompanying drawings:

Fig. 2 is a partly diagrammatic plan view of the machine with certain parts omitted.

Fig. 3 is a partly diagrammatic sectional view of the hydraulic control system.

Fig. 4 is a sectional view showing a driving gear for the neck mold turret.

Figure 1:
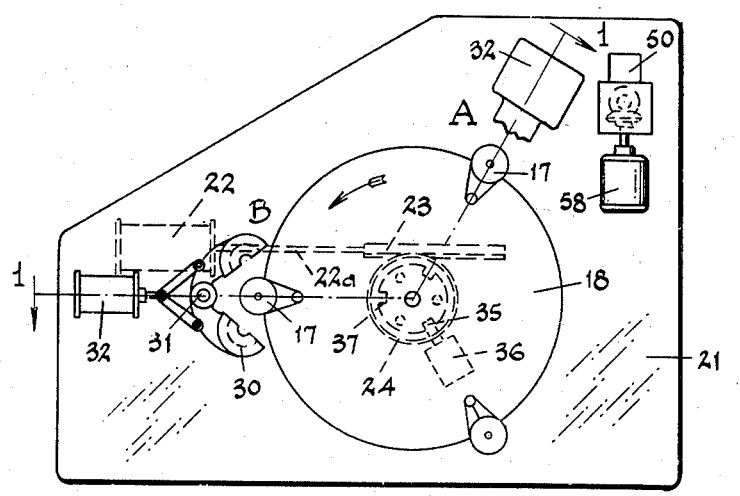
Fig. 1 is an elevaitonal view, with parts broken away and parts in section, of a press molding machine to which the present invention is applied, the view being taken substantially as indicated by the section line 1—1 on Fig. 2.
Figure 1:
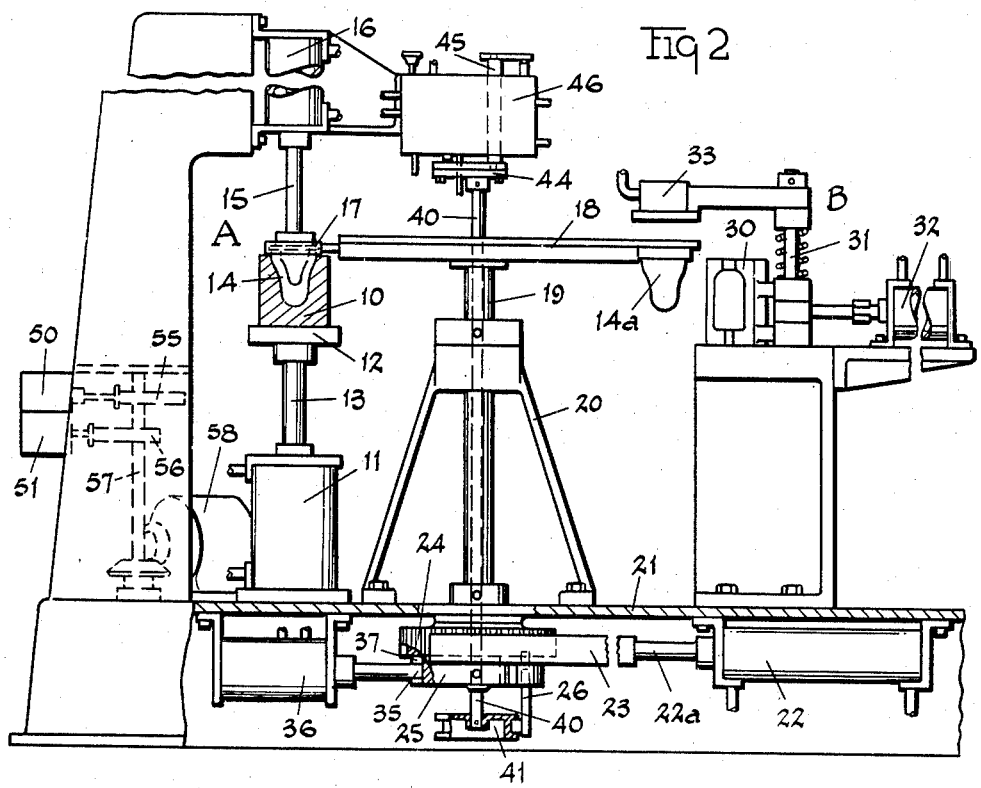

Referring to Figs. 1 and 2, a machine for molding glass bottles or other ware includes a blank mold 10 into which mold charges or gobs of molten glass are dropped. The mold is periodically lifted to the position shown by a piston motor 11 mounted on the machine base 21. The mold is supported on a pad 12 on the motor piston 13. A press plunger 14 is carried on a piston rod 15 of a piston motor 16. Neck molds 17 are carried on a turret comprising a mold table 18 mounted on a vertical tubular shaft 19 which is journalled for rotation in a frame 20 attached to the base plate 21. The table 18 is rotated intermittently step by step, for bringing the neck rings 17 in succession to the blank mold station A where the plunger 14 is lowered and molds the parison 14a in the blank and neck molds.

The means for rotating the mold table 18 comprises a hydraulic piston motor 22. The piston rod 22a of the motor is connected to a rack 23 which runs in mesh with a gear 24 mounted for rotation about the axis of the turret shaft 19. Operating connections between the gear 24 and shaft 19 include a disk 25 (Fig. 4) keyed to the shaft 19 and an indexing pin 26. During the forward stroke of the rack 23 away from the motor 22 the indexing pin 26 is in a lowered position, disconnected from the gear 24, so that the gear is rotated idly and the mold table remains at rest. The indexing pin is then lifted to engage the gear 24 as hereinafter described thereby connecting the mold table for rotation during the return stroke of the piston and rack 23. The indexing movement of the mold table is through an angle of 120°.

After the parison 14a has been formed in the blank mold 10 as above described the motors 11 and 16 operate to withdraw the mold and the press plunger, leaving the parison suspended from the neck mold 17. Each indexing movement of the mold table brings a parison 14a from station A to a finishing mold station B at which a finish mold 30 is mounted. The finish mold comprises partible mold sections mounted to swing about a pivot 31 and operated by a piston motor 32. When the parison is brought to the finishing mold station B, at which it is suspended between the open sections of the finish mold, the motor 32 closes the mold about the suspended parison. A blowhead 33 is then lowered to seat on the mold and blows the parison to its finished form.

While the mold table 18 is at rest during the forward stroke of the rack 23, it is locked in fixed position by a locking detent 35 which is projected by a hydraulic piston motor 36 into a notch or recess 37 formed in the disk 25. As shown in Fig. 2 the disk is provided with a plurality of recesses 37 spaced at angular distances equal to the spacing of the neck molds on the table 18.

The means for connecting and disconnecting the indexing pin 26 to and from the gear 24 includes a vertical shaft 40 extended through the tubular shaft 19. Keyed to the lower end of the shaft 40 is a circular connecting member 41 having an annular recess 42 in its periphery in which runs a roll 43 carried on the indexing pin 26. The shaft 40 is operatively connected at its upper end, by means 44 including a lever 44a, to a piston 45 mounted for up and down movement in a valve casing or block 46. The piston 45 is moved upwardly by a hydraulic piston 47 for disconnecting the index pin 26 from the gear 24. The piston 45 is lowered by a hydraulic piston 48 for projecting the index pin 26 into engagement with the gear 24.

The hydraulic system for indexing the turret and controlling its movements includes control valves 50 and 51 actuated respectively by cams 55 and 56. The cams are mounted on a drive shaft 57 (Fig. 1). The shaft 57 is driven by a motor 58 geared thereto and operated in synchronism with the indexing mechanism.

Operation

The operation is as follows:

With the parts in the positions shown in Figs. 2 and 3, the rack 23 is in its projected or forward position. The indexing pin 26 is in its retracted position to which it has been moved by pressure supplied from the pressure chamber 60 in the valve 50, the pressure line extending through pipe 61 to piston 47 which has thereby lifted the piston 45 and withdrawn the pin 26 from engagement with the gear 24. The locking detent 35 is in its locking position to which it has been moved by pressure supplied from the chamber 60 through pipe 62 to piston 36.

The cam 55 now operates to move the valve piston 63 to the left. This opens the pressure chamber 60 to the line 64 and thereby operates the piston 48 and lowers the piston 45, thus projecting the indexing pin 26 into engagement with the gear 24. Pressure is at the same time supplied through a branch line 65 to the motor 36 and thereby retracts the locking detent 35. The cam 56 next operates to move valve piston 66 of valve 51 to the left. This opens the pressure chamber 67 to the forward end of the indexing cylinder 22 (upper end, Fig. 3), the pressure line extending through a pipe 68 to piston 45, check valve 54 and pipe 70. The piston 22ª is now retracted and operates through the rack and pinion 23, 24 to index the turret, rotating it forward through 120°. This moves the neck ring with the suspended parison from the blank mold station A to the finishing mold station B. The cam 55 next operates to return the valve piston 63 to the right as shown in Fig. 3 again supplying pressure to the piston 47 and thereby disconnecting the indexing pin 26. Pressure is also supplied through line 62 and projects the locking detent 35 to locking position. The turret 18 is thus locked against rotation in either direction. The cam 56 now operates to return the valve piston 66 so that pressure is supplied from chamber 67 through line 69 to the cylinder 22 and moves the rack 23 forward, the gear 24 being rotated idly by the rack bar. This completes the cycle.

Modifications may be resorted to within the spirit and scope of my invention.

I claim:

1. The combination of a piston motor comprising a reciprocating piston, a driven element mounted for rotation about an axis, a gear mounted for rotation about said axis independently of the driven element and while the driven element is at rest, a rack connected to the motor piston for reciprocation therewith and having driving connection with said gear and thereby driving the gear alternately in forward and rearward direction, an indexing pin connected to the driven element for rotation therewith, fluid operated means for automatically projecting the indexing pin into driving engagement with the said gear while the rack is in its projected position and thereby causing the piston to rotate the driven element during the return movement of the rack, said fluid operated means operable to withdraw the driving pin when the rack has completed its return movement, a locking detent, and automatic means for projecting the locking detent into position to lock the driven element at the completion of said return movement of the rack and for withdrawing the locking detent when the rack has completed its forward movement, the means for operating the locking detent comprising a fluid operated motor, valve mechanism controlling the operation of said fluid operated motor, and automatic means for actuating the valve mechanism in synchronism with the operations of the piston motor.

2. The combination of a turret mounted for rotation about an axis, a gear mounted for rotation about said axis independently of the turret, an indexing piston motor comprising a piston rod, a rack attached to said rod and running in mesh with said gear, an indexing pin mounted for rotation with the turret about said axis, hydraulic motors operatively connected to said pin and operative to move the pin into and out of engagement with said gear, valve mechanism controlling a supply of operating fluid to the said hydraulic motors, means for operating the valve mechanism in timed relation to the operation of the said indexing motor and operable to effect an indexing movement of the rack bar and turret while the indexing pin is in engagement with the gear and to withdraw the indexing pin at the completion of the indexing movement of the turret, permitting a return movement of the rack bar and idle rotation of the said gear by the rack bar during said return movement while the turret is at rest, a locking detent, a fluid motor connected to the detent and operable to move the detent into and out of locking relation to the turret for holding the latter in fixed position during the return movement of the rack bar, said detent operating motor being connected through fluid pressure lines to the said valve mechanism.

3. The combination of a turret comprising a vertical shaft mounted for rotation about a vertical axis, means for rotating the turret intermittently step by step about said axis, said means comprising an indexing piston motor including a reciprocating piston, means providing driving connections between the piston motor and the turret including a gear mounted for free rotation about said axis, a rack bar connected to the motor piston and running in mesh with said gear throughout the reciprocating movement of the motor piston, an element keyed to said shaft for rotation therewith, an indexing pin carried by said element and movable into and out of driving engagement with the said gear, a locking detent movable into and out of locking engagement with said driven element and locking the turret against rotation while in engagement with said element, automatic means for moving the indexing pin into engagement with said gear and holding it in said engagement during the indexing movement of the turret and for automatically withdrawing the indexing pin at the completion of said indexing movement of the turret and thereby permitting said gear to rotate idly during the return movement of the motor piston and rack, and automatic means for moving the locking detent into locking position at the completion of the indexing movement of the turret and locking the turret against rotative movement during the idle stroke of the motor piston, and for withdrawing the locking detent at the completion of the said idle stroke and concurrently with the projection of the indexing pin into engagement with the said gear, the means for operating said indexing pin and locking detent comprising hydraulic motors individual to said pin and detent, a timer shaft, a motor having driving connection with the timer shaft, timer cams driven by the timer shaft, valves actuated by said cams and operable to control the supply of operating fluid to said hydraulic motors.

4. The combination of a piston motor comprising a reciprocating piston, a driven element mounted for rotation about an axis, a gear mounted for rotation about said axis independently of the driven element and while the driven element is at rest, a rack connected to the motor piston for reciprocation therewith and having driving connection with said gear and thereby driving the gear alternately in forward and rearward direction, and indexing pin connected to the driven element for rotation therewith, fluid operated means for automatically projecting the indexing pin into driving engagement with the said gear while the rack is in its projected position and thereby causing the piston to rotate the driven element during the return movement of the rack, said fluid operated means operable to withdraw the driving pin when the rack has completed its return movement, a locking detent, and automatic means for projecting the locking detent into position to lock the driven element at the completion of said return movement of the rack and for withdrawing the locking detent when the rack has completed its forward movement, the means for actuating the said indexing pin comprising a fluid operated motor, valve mechanism controlling the operation of said last mentioned motor, and automatic means for operating the valve mechanism in timed relation to the operations of the said piston motor.

References Cited in the file of this patent

UNITED STATES PATENTS

| 1,942,927 | Johnson et al. | Jan. 9, 1934 |
| 2,174,569 | Dinzl | Oct. 3, 1939 |
| 2,672,773 | Schofield | Mar. 23, 1954 |